US008904613B2

(12) United States Patent
Hung

(10) Patent No.: US 8,904,613 B2
(45) Date of Patent: Dec. 9, 2014

(54) POWER STRUCTURE OF A HYDRAULIC TOOL

(76) Inventor: Jung-Liang Hung, Minsyong Township, Chiayi County (TW)

( * ) Notice: Subject to any disclaimer, the term of this patent is extended or adjusted under 35 U.S.C. 154(b) by 714 days.

(21) Appl. No.: 13/236,457

(22) Filed: Sep. 19, 2011

(65) Prior Publication Data

US 2013/0068494 A1 Mar. 21, 2013

(51) Int. Cl.

| | |
|---|---|
| ***B23P 19/04*** | (2006.01) |
| ***B25B 27/00*** | (2006.01) |
| ***B25B 27/14*** | (2006.01) |
| ***B25B 27/06*** | (2006.01) |

(52) U.S. Cl.

CPC .................................... *B25B 27/062* (2013.01)

USPC ................... 29/252; 29/255; 29/270; 29/278; 29/271

(58) Field of Classification Search

USPC ........... 29/255, 270, 278, 244, 252, 238, 239, 29/271, 280, 253

See application file for complete search history.

(56) References Cited

U.S. PATENT DOCUMENTS

| | | | | |
|---|---|---|---|---|
| 3,638,294 | A * | 2/1972 | Durant | 29/252 |
| 5,233,740 | A * | 8/1993 | Chen | 29/252 |
| 5,419,027 | A * | 5/1995 | McPeak et al. | 29/252 |
| 5,896,639 | A * | 4/1999 | Chen | 29/261 |
| 6,895,646 | B1 * | 5/2005 | Houg | 29/252 |
| 8,146,221 | B2 * | 4/2012 | Hung | 29/252 |
| 2010/0095499 | A1 * | 4/2010 | Hung | 29/252 |
| 2010/0127230 | A1 * | 5/2010 | Hung | 254/93 R |

* cited by examiner

*Primary Examiner* — Lee D Wilson

*Assistant Examiner* — Seahee Yoon

(74) *Attorney, Agent, or Firm* — Alan Kamrath; Kamrath IP Lawfirm, P.A.

(57) ABSTRACT

A power structure of a hydraulic tool contains a base including an outer thread section, a first passage, a second passage, a first hole, a second hole, and a first groove; a first connecting unit including a first tap, a first adapter, a first joint, and a first check nut; a second connecting unit including a second tap, a second adapter, a second joint, and a second check nut; a cylindrical tube including a receiving space, first external screws, first internal screws, and second internal screws; a first spindle including a first path and a second groove; a second spindle including a second path, two orifices, second external screws, third internal screws, and a third groove; a retaining loop; a fitting loop; a plug; a paw unit.

9 Claims, 4 Drawing Sheets

POWER STRUCTURE OF A HYDRAULIC TOOL

BACKGROUND OF THE INVENTION

1. Field of the Invention

The present invention relates to a power structure of a hydraulic tool, and more particularly to the power structure including a first connecting unit and a second connecting unit connected with a power source, and a second spindle of a hydraulic tube being used to output a power, thus forming a reciprocated operating output structure of a double-directional hydraulic power.

2. Description of the Prior Art

A conventional power structure of a hydraulic tool includes a double-operating pipeline connected with a hydraulic tube so that a pressure source is outputted to generate a larger hydraulic power. However, when the conventional power structure matches with other components of another power unit to operate, an interrupted space will generate to influence an effective output travel. In addition, an operating space is limited, having replacement and maintenance inconvenience. A connection of the pipeline is provided with the hydraulic tube to affect the output travel, the other components of another power unit which match with the conventional power structure, and the replacement and maintenance of the pipeline.

The present invention has arisen to mitigate and/or obviate the afore-described disadvantages.

SUMMARY OF THE INVENTION

The primary object of the present invention is to provide a power structure of a hydraulic tool that has an independent pipeline without influencing a power output and disassembly.

Another object of the present invention is to provide a power structure of a hydraulic tool that is capable of being prolonged service life, maintained easily, and matching with other power elements easily.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
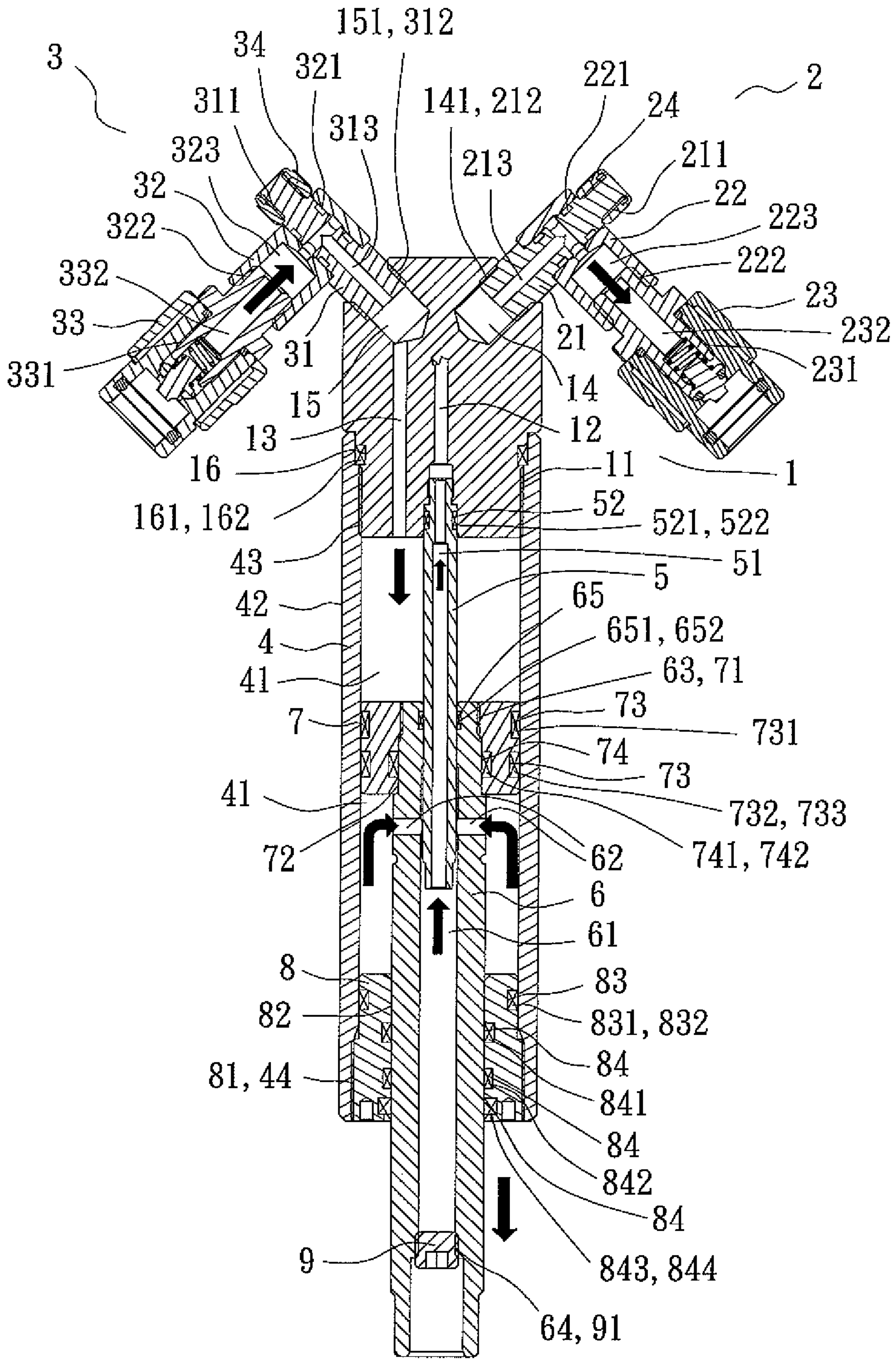
FIG. 1 is a cross sectional view showing the operation of a power structure of a hydraulic tool according to a preferred embodiment of the present invention.

With reference to FIG. 1, a power structure of a hydraulic tool according to a preferred embodiment of the present invention comprises: a base 1, a first connecting unit 2, a second connecting unit 3, a cylindrical tube 4, a first spindle 5, a second spindle 6, a retaining loop 7, a fitting loop 8, a plug 9, and a paw unit 10; wherein the base 1 includes an outer thread section 11, a first passage 12, a second passage 13, a first hole 14, a second hole 15, a first groove 16, the first passage 12 is connected with the first hole 14, and the second passage 13 is coupled with the second hole 15, the first hole 14 includes first inner threads 141, the second hole 15 includes second inner threads 151; the first groove 16 of the base 1 includes a first O-ring 161 and a first supporting ring 162;

the first connecting unit 2 includes a first tap 21, a first adapter 22, and a first joint 23, the first tap 21 includes first outer threads 211, second outer threads 212, and a first tunnel 213, the second outer threads 212 are screwed with the first inner threads 141 of the first hole 14 of the base 1, the first tunnel 213 communicates with the first passage 12 of the base 1, the first adapter 22 includes a first vertical screw section 221, a first horizontal screw section 222, and a first channel 223, and the vertical screw section 221 is screwed with the first outer threads 211 of the first tap 21, the first channel 223 is connected with the first tunnel 213 of the first tap 21, the first joint 23 includes third outer threads 231 and a first passageway 232, the third outer threads 231 are screwed with the first horizontal screw section 222 of the first adapter 22, the first passageway 232 communicates with the first channel 223 of the first adapter 22; a first check nut 24 is screwed with the first outer threads 211 of the first tap 21;

the second connecting unit 3 includes a second tap 31, a second adapter 32, and a second joint 33, the second tap 31 includes fourth outer threads 311, fifth outer threads 312, and a second tunnel 313, the fifth outer threads 312 are screwed with the second inner threads 151 of the second hole 15 of the base 1, and the second tunnel 313 communicates with the second passage 13 of the base 1, the second adapter 32 includes a second vertical screw section 321, a second horizontal screw section 322, and a second channel 323, the second vertical screw section 321 is screwed with the fourth outer threads 311 of the second tap 31, the second adapter 32 communicates with the second tunnel 313 of the second tap 31, the second joint 33 includes sixth outer threads 331 and a second passageway 332, the sixth outer threads 331 are screwed with the second horizontal screw section 322 of the second adapter 32, the second passageway 332 communicates with the second channel 323 of the second adapter 32; a second check nut 34 is screwed with the fourth outer threads 311 of the second tap 31;

the cylindrical tube 4 includes a receiving space 41, first external screws 42, first internal screws 43, and second internal screws 44, and the first internal screws 43 of the cylindrical tube 4 are screwed with the outer thread section 11 of the base 1;

the first spindle 5 is fixed in the receiving room 41 of the cylindrical tube 4 and includes a first path 51 and a second groove 52, the first spindle 5 is secured in the first passage 12 of the base 1; the second groove 52 of the first spindle 5 includes a second O-ring 521 and two second supporting rings 522, and one of the two second supporting rings 522, the second O-ring 521, and another of the two second supporting rings 522 are arranged in order;

the second spindle 6 is fixed in the receiving space 41 of the hydraulic tube 4 and includes a second path 61, two orifices 62, second external screws 63, third internal screws 64, and a third groove 65, the first spindle 5 is disposed between the second path 61 of the second spindle 6 and the two orifices 62, and between the first spindle 5 and the second path 61 of the second spindle 6 is defined a tiny gap; the third groove 65 of the second spindle 6 includes a third O-ring 651 and two third supporting rings 652, and one of the two third supporting rings 652, the third O-ring 651, and another of the two third supporting rings 652 are arranged in order;

the retaining loop 7 includes fourth internal screws 71, a first aperture 72, two first slots 73, and a second slot 74, the retaining loop 7 is fitted with the second spindle 6 by using the first aperture 72, the fourth internal screws 71 are screwed with the second external screws 63 of the second spindle 6; each first slot 73 of the retaining loop 7 includes a first wear-proof member 731, a fourth O-ring 732 and two fourth supporting rings 733, the second slot 74 includes a fifth O-ring 741 and two fifth supporting rings 742, and one of the two fifth supporting rings 742, the fifth O-ring 741, and another of the two fifth supporting rings 742 are arranged in turn;

the fitting loop 8 includes third external screws 81, a second aperture 82, a third slot 83, and three fourth slots 84, the fitting loop 8 is fitted with the second spindle 6 by ways of the second aperture 82, and the second external screws 63 are screwed with the second internal screws 44 of the cylindrical tube 4; the third slot 83 of the fitting loop 8 includes a sixth O-ring 831 and a sixth supporting rings 832, and each fourth slot 84 includes a seventh O-ring 841, a seventh supporting ring 842, a second wear-proof member 843, and a dust-proof member 844.

The plug 9 includes fourth external screws 91 to screw with the third internal screws 64 of the second spindle 64.

Figure 3:
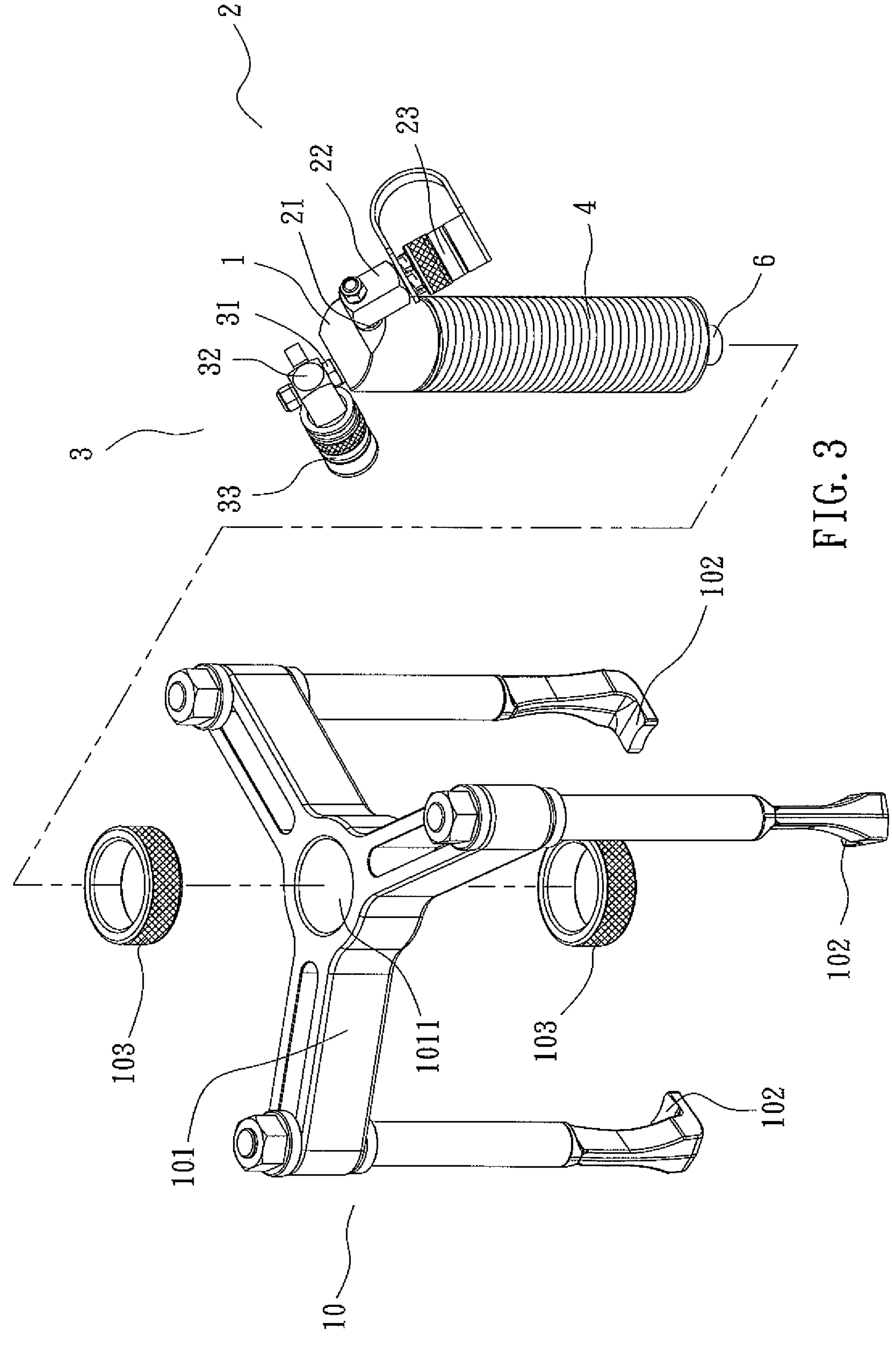
FIG. 3 is a perspective view showing the exploded components of the power structure of the hydraulic tool according to the preferred embodiment of the present invention.

The paw unit 10 (as shown in FIG. 3) includes a seat 101, three hooks 102, and two locking circles 103, the seat 101 includes a bore 1011.

In operation, a hydraulic oil of a power source flows into the receiving room 41 of the cylindrical tube 4 via the second passageway 332 of the second joint 33 of the second connecting unit 3, the second channel 323 (denoted by a rightward upper arrow) of the second adapter 32, the second tunnel 313 of the second tap 31, and the second hole 15 and the second passage 13 of the base 1, and then the receiving room 41 of the cylindrical tube 4 is separated into two sub-receiving rooms (i.e., a first sub-receiving room to cover the cylindrical tube 4 and the first spindle 5; and a second sub-receiving room to cover the cylindrical tube 4 and the second spindle 6), so a flowing pressure of the hydraulic oil (represented by a downward arrow of the first sub-receiving room) pushes the retaining loop 7 to move downward so that the first sub-receiving room becomes larger and the second sub-receiving room is pressed, when the retaining loop 7 actuates the second spindle 6 to move downward, the hydraulic oil flows into the second path 61 (denoted by a first upper arrow) of the second spindle 6 from the two orifices 62 (represented by a curved arrow of the second sub-receiving room) of the second spindle 6, and then the hydraulic oil flows into the first tunnel 213 of the first tap 21 of the first connecting unit 2 through the first path 51 of the first spindle 5 (denoted by a second upper arrow) and the first passage 12 of the base 1, thereafter the hydraulic oil flows back to the power source via the first channel 223 of the first adapter 22 (represented by a rightward lower arrow) and the first passageway 232 of the first joint 23.

While the second spindle 6 of the cylindrical tube 4 pushes outward, the hydraulic oil will flow based on two following lines:

1. High-pressure flowing line: the power source→the second passageway 332→the second channel 323→the second tunnel 313→the second hole 15→the second passage 13→the receiving space 41 (the first sub-receiving room) of the cylindrical tube 4→the retaining loop 7→the second spindle 6 is actuated to move downward.

2. Low-pressure flowing line: the receiving space 41 (the second sub-receiving room) of the cylindrical tube 4→the two orifices 62→the second path 61→the first path 51→the first passage 12→the first tunnel 213→the first channel 223→the first passageway 232→the power source.

Figure 2:
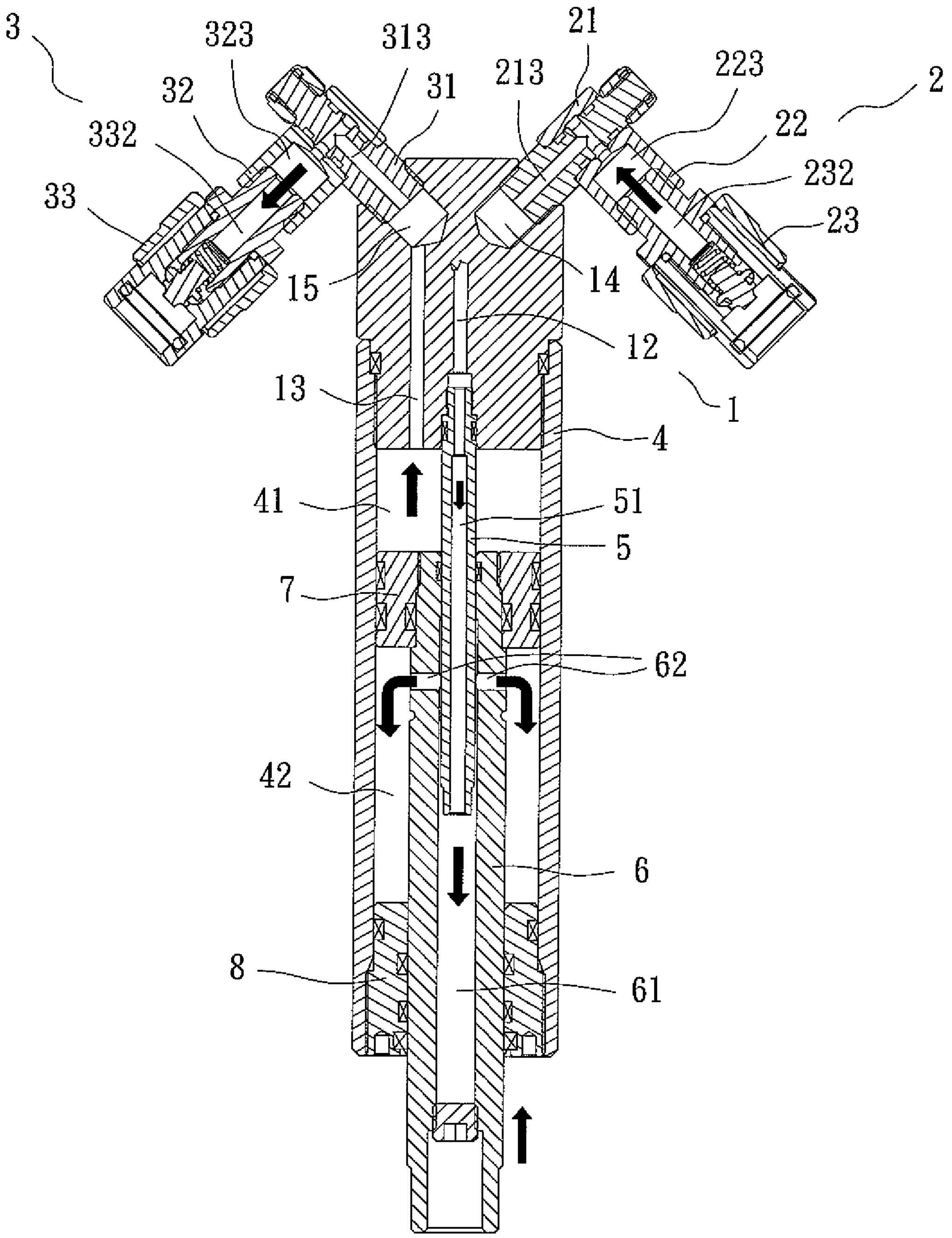
FIG. 2 is another cross sectional view showing the operation of the power structure of the hydraulic tool according to the preferred embodiment of the present invention.

As illustrated in FIG. 2, in operation, the hydraulic oil of the power source flows into the first path 51 of the first spindle 5 (denoted by a first lower arrow) and the second path 61 of the second spindle 6 (denoted by a second lower arrow) from the first passageway 232 of the first joint 23 of the first connecting unit 2 via the first channel 223 of the first adapter 22 (represented by a leftward upper arrow), the first tunnel 213 of the first tap 21, and the first hole 14 and the first passage 12 of the base 1, and the hydraulic oil simultaneously flows into the receiving space 41 (the second-receiving room) of the hydraulic tube 4 via the two orifices 62 (represented by the curved arrow of the second sub-receiving room) of the second spindle 6 so that the retaining loop 7 is pushed upward, and the second sub-receiving room becomes larger and the first sub-receiving room is pressed, thereafter the retaining loop 7 actuates the second spindle 6 to move upward so that the hydraulic oil flows into the second tunnel 313 of the second tap 31 of the second connecting unit 3 through the first passage 12 of the base 1, and then the hydraulic oil flows back to the power source via the second channel 323 (denoted by a leftward lower arrow) of the second adapter 32 and the second passageway 332 of the second joint 33.

When the second spindle 6 of the hydraulic tube 4 retracts inward or releases, the hydraulic oil will flow according to two lines as follows:

1. High-pressure flowing line: the power source→the first passageway 232→the first channel 223→the first tunnel 213→the first hole 14→the first passage 12→the first path 51→the second path 61→the receiving space 41 (the first sub-receiving room) of the cylindrical tube 4→the retaining loop 7 actuates the second spindle 6 to move upward.

2. Low-pressure flowing line: the receiving space 41 (the first sub-receiving room) of the cylindrical tube 4→the second passage 13→the second tunnel 313→the second channel 323→the second passageway 332→the power source.

Figure 4:
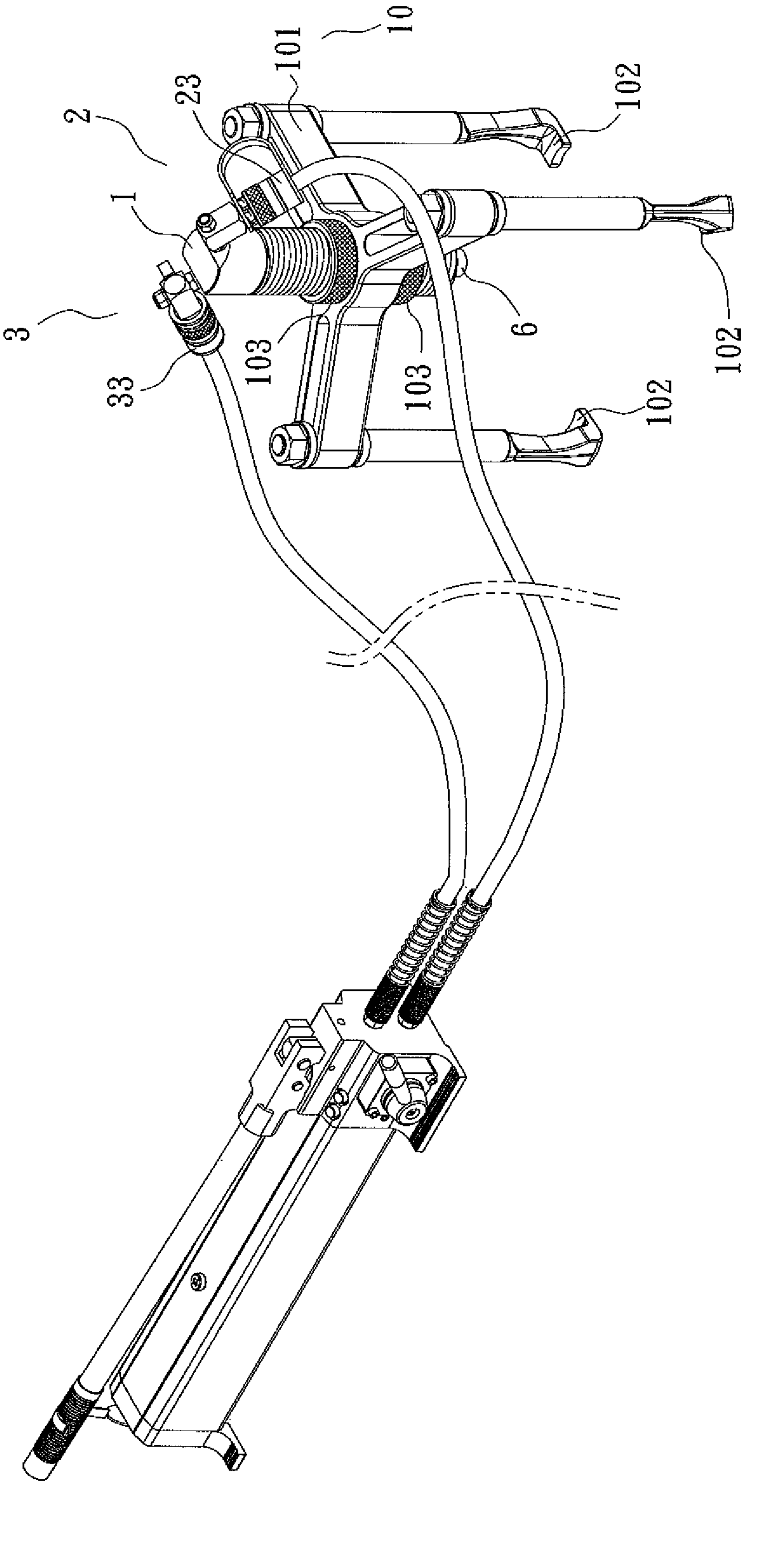
FIG. 4 is a perspective view showing the assembly of the power structure of the hydraulic tool according to the preferred embodiment of the present invention.

Referring to FIGS. 3 and 4, the paw unit 10 includes the seat 101, the three hooks 102, and the two locking circles 103, the seat 101 includes the bore 1011, such that the first connecting unit 2 (including the first tap 21, the first adapter 22, and the first joint 23) and the second connecting unit 3 (including the second tap 31, the second adapter 32, and the second joint 33) are connected with the power source, and the hydraulic tube 4 is inserted into the bore 1011 of the paw unit 10, the two locking circles 103 of the seat 101 are respectively screwed with the first external screws 42 to fix the hydraulic tube 4, thus forming a reciprocated operating output structure of a double-directional hydraulic power.

Two pressure pipes of a pressure source are coupled with the first joint 23 of the first connecting unit 2 and the second joint 33 of the second connecting unit 3, and a flowing direction of the hydraulic oil of the pressure source is shifted so that the second spindle 6 is pushed outward (the operation is the same as a description of FIG. 1) or retracted backward (the operation is the same as a description of FIG. 2) to match with the three hooks 102 of the paw unit 10 to generate the reciprocated operating output structure of the double-directional hydraulic power. Thereby, the reciprocated operating output structure of the double-directional hydraulic power is used to disassemble related components of a large mechanical structure.

Accordingly, the hydraulic tube has an independent pipeline without influencing a power output and disassembly, and it is capable of being prolonged service life, maintained easily, and matching with other power elements easily.

While we have shown and described various embodiments in accordance with the present invention, it is clear to those skilled in the art that further embodiments may be made without departing from the scope of the present invention.

What is claimed is:

1. A power structure of a hydraulic tool comprising:

a base including an outer thread section, a first passage, a second passage, a first hole, a second hole, and a first groove, the first passage being connected with the first hole, and the second passage being coupled with the second hole, the first hole including first inner threads, the second hole including second inner threads;

a first connecting unit including a first tap, a first adapter, a first joint, and a first check nut, the first tap including first outer threads, second outer threads, and a first tunnel, the second outer threads being screwed with the first inner threads of the first hole of the base, the first tunnel communicating with the first passage of the base, the first adapter including a first vertical screw section, a first horizontal screw section, and a first channel, and the vertical screw section being screwed with the first outer threads of the first tap, the first channel being connected with the first tunnel of the first tap, the first joint including third outer threads and a first passageway, the third outer threads being screwed with the first horizontal screw section of the first adapter, the first passageway communicating with the first channel of the first adapter; the first check nut being screwed with the first outer threads of the first tap;

a second connecting unit including a second tap, a second adapter, a second joint, and a second check nut, the second tap including fourth outer threads, fifth outer threads, and a second tunnel, the fifth outer threads being screwed with the second inner threads of the second hole of the base, and the second tunnel communicating with the second passage of the base, the second adapter including a second vertical screw section, a second horizontal screw section, and a second channel, the second vertical screw section being screwed with the fourth outer threads of the second tap, the second adapter communicating with the second tunnel of the second tap, the second joint including sixth outer threads and a second passageway, the sixth outer threads being screwed with the second horizontal screw section of the second adapter, the second passageway communicating with the second channel of the second adapter, and the second check nut being screwed with the fourth outer threads of the second tap;

a cylindrical tube including a receiving space, first external screws, first internal screws, and second internal screws, and the first internal screws of the cylindrical tube being screwed with the outer thread section of the base;

a first spindle fixed in the receiving space of the cylindrical tube and including a first path and a second groove, the first spindle being secured in the first passage of the base;

a second spindle fixed in the receiving space of the cylindrical tube and including a second path, two orifices, second external screws, third internal screws, and a third groove, the first spindle being disposed between the second path of the second spindle and the two orifices, and between the first spindle and the second path of the second spindle being defined a tiny gap;

a retaining loop fixed in the receiving space of the cylindrical tube and including fourth internal screws, a first aperture, two first slots, and a second slot, the retaining loop being fitted with the second spindle by using the first aperture, the fourth internal screws being screwed with the second external screws of the second spindle;

a fitting loop fixed in the receiving space of the cylindrical tube and including third external screws, a second aperture, a third slot, and three fourth slots, the fitting loop being fitted with the second spindle by ways of the second aperture, and the second external screws being screwed with the second internal screws of the cylindrical tube;

a plug including fourth external screws to screw with the third internal screws of the second spindle;

a paw unit including a seat, three hooks, and two locking circles, the seat including a bore;

such that the first connecting unit and the second connecting unit are connected with a power source, and the cylindrical tube is inserted into the bore of the paw unit, the two locking circles of the seat are respectively screwed with the first external screws to fix the cylindrical tube, thus forming a reciprocated operating output structure of a double-directional hydraulic power.

2. The power structure of the hydraulic tool as claimed in claim 1, wherein the first groove of the base includes a first O-ring and a first supporting ring.

3. The power structure of the hydraulic tool as claimed in claim 1, wherein the second groove of the first spindle includes a second O-ring and two second supporting rings.

4. The power structure of the hydraulic tool as claimed in claim 3, wherein one of the two second supporting rings, the second O-ring, and another of the two second supporting rings are arranged in order.

5. The power structure of the hydraulic tool as claimed in claim 1, wherein the third groove of the second spindle includes a third O-ring and two third supporting rings.

6. The power structure of the hydraulic tool as claimed in claim 5, wherein one of the two third supporting rings, the third O-ring, and another of the two third supporting rings are arranged in order.

7. The power structure of the hydraulic tool as claimed in claim 1, wherein each first slot of the retaining loop includes a first wear-proof member, a fourth O-ring, and two fourth supporting rings, the second slot includes a fifth O-ring and two fifth supporting rings.

8. The power structure of the hydraulic tool as claimed in claim 7, wherein one of the two fifth supporting rings, the fifth O-ring, and another of the two fifth supporting rings are arranged in turn.

9. The power structure of the hydraulic tool as claimed in claim 1, wherein the third slot of the fitting loop includes a sixth O-ring and a sixth supporting rings, and each fourth slot includes a seventh O-ring, a seventh supporting ring, a second wear-proof member, and a dust-proof member.

* * * * *